April 1, 1941. E. G. ALVES 2,236,558
PLOW
Filed Feb. 24, 1939
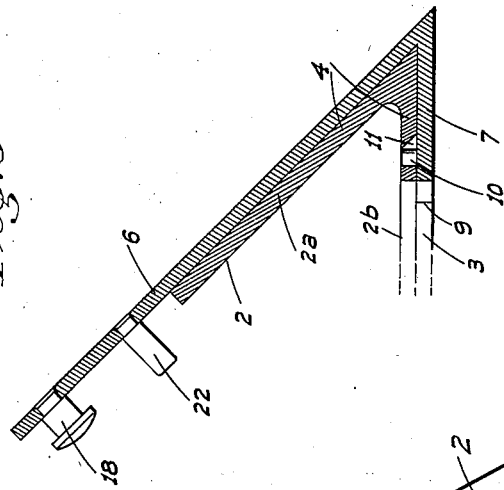
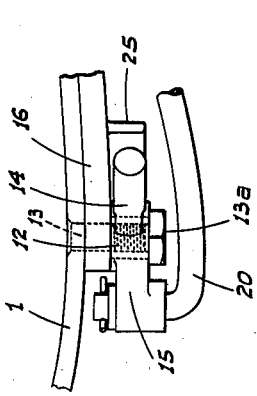
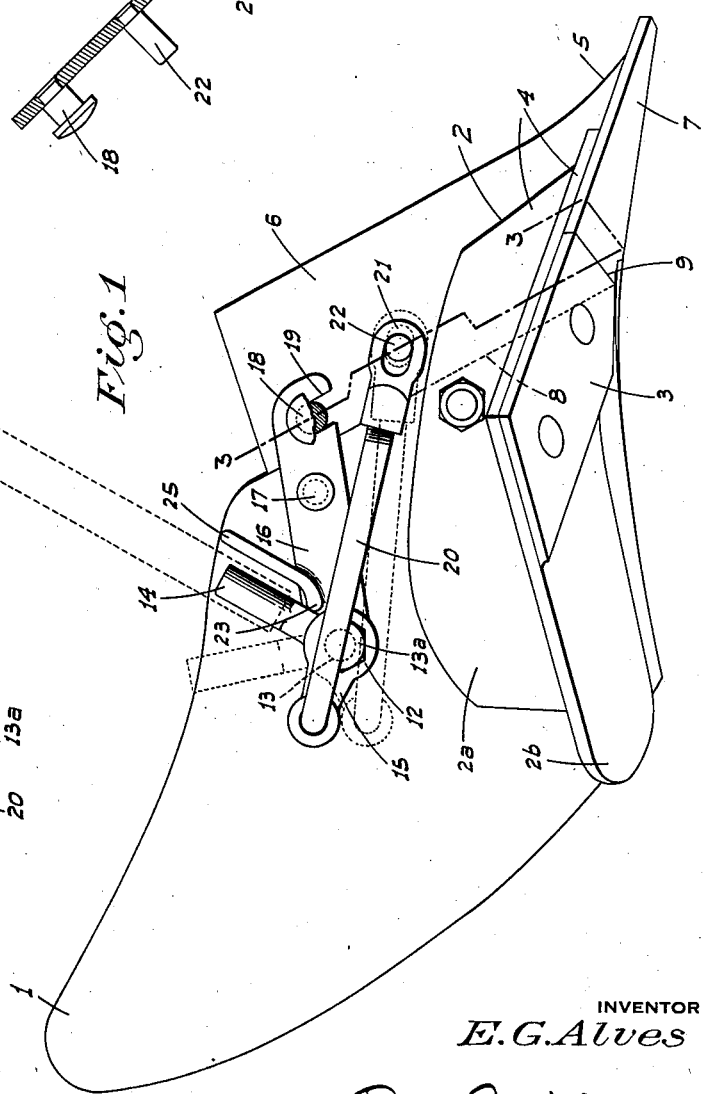
INVENTOR
E. G. Alves
BY
ATTORNEY

UNITED STATES PATENT OFFICE 2,236,558

PLOW

Eugene G. Alves, Pittsburg, Calif.

Application February 24, 1939, Serial No. 258,217

1 Claim. (Cl. 97—124)

This invention relates in general to an improved agricultural implement and in particular the invention is directed to an improvement in that type of earth turning plow which includes a removable share.

I am aware that plows of the type described have been provided heretofore with certain devices to secure the share on the frog and moldboard in quick detachable relation whereby to facilitate detachment and replacement of such removable shares, and I make no claim to such combination.

However, it is the principal object of my invention to provide, in a plow having a removable share, an improved share attaching and locking device; such device being rugged, durable, positive in action and yet simple and inexpensive in structure, as well as exceedingly effective for the purpose designed.

Another object of the invention is to provide guard means to prevent accidental tripping of the locking lever during use of the plow.

Figure 1 is an elevation of a plow having a removable share and provided with my improved share attaching and locking device.

Figure 2 is a fragmentary plan view of the attaching and locking device.

Figure 3 is a cross section taken on line 3—3 of Fig. 1.

Referring now more particularly to the characters of reference on the drawing, the numeral 1 indicates a moldboard having an angular frog 2 secured thereto as usual and including a moldboard portion 2a and a land-side portion 2b; there being a land-side 3 fixed on the land-side portion 2b of the frog. The forward end or point of the frog extends, as at 4, beyond the forward edges of the land-side 3 and moldboard.

A removable share comprising in usual relation a point 5, a share skirt 6 and a land-side member 7, is removably and symmetrically engaged with the projecting portion 4 of frog 2; the back edge of the share skirt 6 engaging the forward edge of the moldboard in abutting edge to edge relation, as at 8, while the back edge of the land-side member 7 similarly engages the forward edge of land-side 3, as at 9. A locking pin 10 extending inwardly from share member 7 engages in a socket 11 formed in the adjacent surface of the projecting portion of the frog, this pin and socket arrangement preventing lateral displacement of the share relative to the moldboard and frog.

The share is attached on and locked with the moldboard and frog in quick detachable relation by means of the following mechanism:

On the back side of the moldboard 1 at a point above the frog and some distance from the forward edge of said moldboard, a bell crank lever 12 is pivoted on a stub shaft 13 having a sleeve nut 13a on its outer end; one arm 14 of the lever projecting upward, while the other arm 15 projects rearwardly.

A latch bar 16 is secured in face to face relation on the back side of the moldboard and is fixed in place by shaft 13 and a bolt or rivet 17; such bar overlapping the share skirt 6. The skirt 6 is provided with a headed pin 18 and the bar 16 is slotted from its lower edge as at 19; the pin being engaged in said slot and the portion of the bar adjacent the slot frictionally engaging under the pin head.

A link 20 is pivoted at one end on the outer end of the lever arm 15, while the other end of such link is formed with an adjustable slotted head 21 which removably engages over a fixed pin 22 projecting from the share skirt 6 below headed pin 18. When the bell crank lever is in the position shown in full lines in Fig. 1, the link has been tensioned and snapped upward past dead center; a stop 23 on bar 16 preventing forward movement of arm 14. When the mechanism is so positioned, the removable share is under a tension which draws it in a generally upward and inward direction into positive engagement with the moldboard and frog.

A section of pipe 24 slips on arm 14 and serves as the actuating handle therefor; the arm 14 being thrown rearwardly to the position shown in dotted lines in Fig. 1 when the share is to be removed for repair or replacement. Such movement of arm 14 drops link 20 below center and relieves the tension thereon whereupon head 21 is removed from pin 22. Thereafter the share is released from bar 16 as well as from the moldboard and frog by driving downward on the upper end thereof; pin 10 being backed out of socket 11 by such movement of the share. In the manner above described a share can be quickly and easily detached from the plow, and another share replaced.

In order to prevent an object from accidentally tripping arm 14 rearwardly when link 20 is under tension and holding a share in place, I extend the stop 23 as a guard 25 for the full length of arm 14 and to a height outwardly of the plane of said arm.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a plow including the combination of a moldboard, a removable share having a skirt whose rear edge abuts the forward edge of the moldboard, and a locking device mounted on the moldboard and releasably connected with the share skirt, the locking device including a lever pivoted on the landside of the moldboard and having an operating arm; said operating arm projecting in an upward direction in spaced relation to the moldboard and being swingable in a plane substantially parallel to the adjacent portion thereof, said arm terminating at its upper end below the upper edge of the moldboard and being adapted for detachable coupling engagement with a tubular operating extension, a stop on the moldboard positioned for engagement by the arm upon predetermined swinging movement thereof in the direction of the share, and a guard projecting outwardly from the landside of the moldboard between said arm and said share, the guard being of a width and height to prevent objects approached by the plow from striking the arm upon forward movement of said plow, the guard, when the arm is in engagement with the stop, being spaced from said arm a distance to permit unobstructed coupling engagement of the operating extension with said arm.

EUGENE G. ALVES.